April 24, 1945.  E. D. CAMPBELL  2,374,583
COOKING UTENSIL
Filed Sept. 11, 1944  2 Sheets-Sheet 1

Inventor
EDWARD D. CAMPBELL,
By Clarence A. O'Brien
and Harvey B. Jacobson
Attorneys April 24, 1945.     E. D. CAMPBELL     2,374,583
COOKING UTENSIL
Filed Sept. 11, 1944     2 Sheets-Sheet 2

Inventor
EDWARD D. CAMPBELL,

By Clarence A. O'Brien
and Harvey B. Jacobson
Attorneys

Patented Apr. 24, 1945

2,374,583

UNITED STATES PATENT OFFICE 2,374,583

COOKING UTENSIL

Edward D. Campbell, Brunswick, Ga.

Application September 11, 1944, Serial No. 553,601

2 Claims. (Cl. 220—23.2)

This invention relates to cooking utensils, and more particularly to such devices adapted to be utilized in a variety of ways for cooking various foods.

The primary object of this invention is the provision of an improved cooking utensil comprised of two pans or the like, secured together in such manner that they may be positioned in any desired location, in an oven or on a stove or the like, and so arranged that they may be relatively widely separated or spaced close together, while still being retained in related assembly.

Another object of this invention is the provision of such a cooking utensil wherein one pan may be used as a cover member for the other in certain types of cooking, if desired.

A still further object is the provision of such a cooking utensil which may be readily adapted for the preparation of a variety of foods and in a variety of manners, as by baking, frying, stewing, broiling, or the like.

Still other objects reside in the combination of elements, arrangement of parts, and features of construction, all as will be more fully pointed out hereinafter and shown in the accompanying drawings, wherein there is disclosed a preferred embodiment of this inventive concept.

In the drawings.

Like reference numerals refer to like parts throughout the several views of the drawings.

Figure 1:
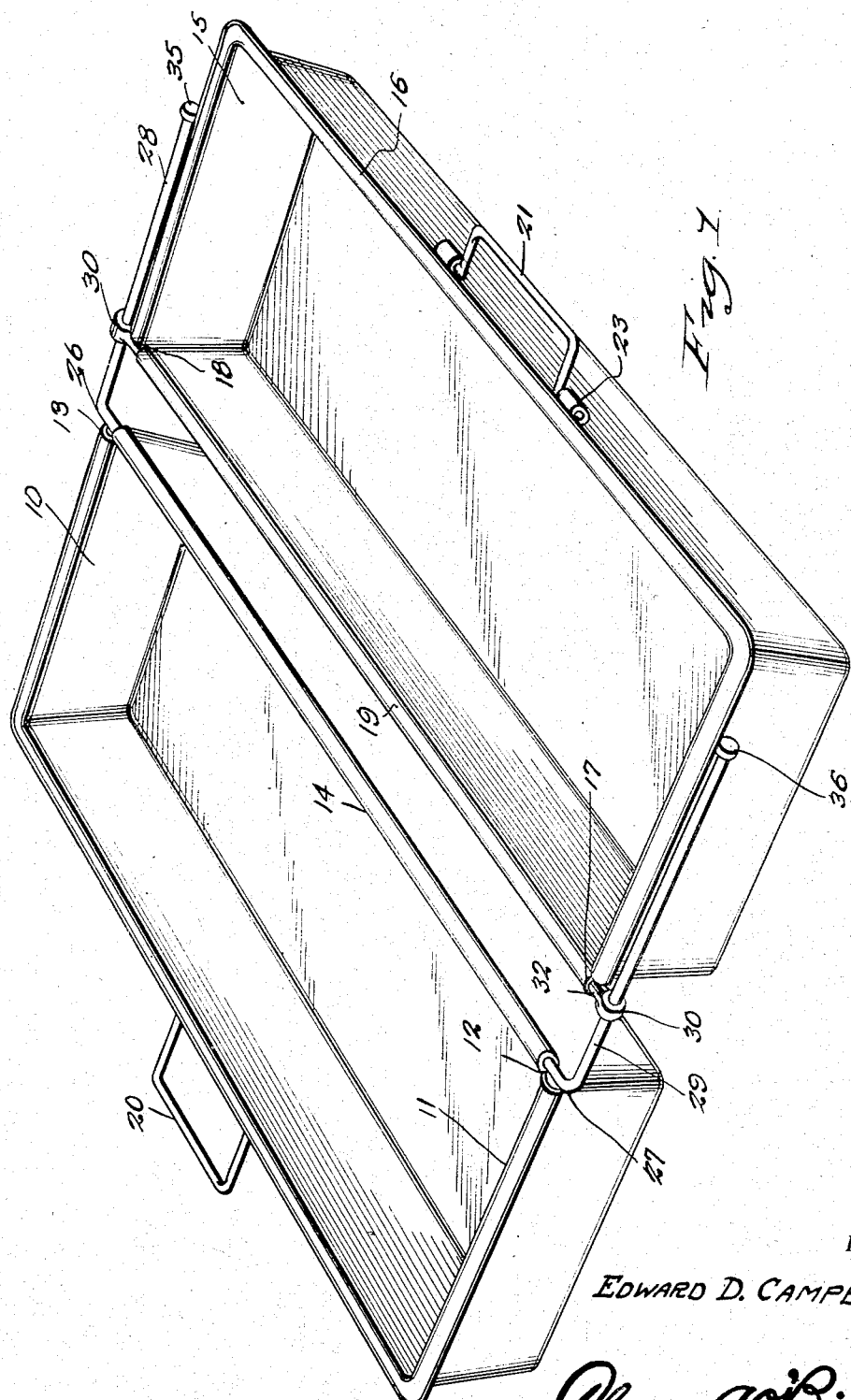
Figure 1 is a perspective view of one form of pan embodying features of this inventive concept.

Having reference now to the drawings, there is shown at 10 a pan or the like, in the illustrative embodiment of rectangular configuration, provided with a beaded top edge 11, the bead being cut at adjacent corners, as at 12, and 13, to provide a hollow sleeve or channel 14 along one edge thereof.

A second pan 15 is similarly provided with a bead 16 cut away at the corners, as at 17 and 18, to provide a channel or sleeve 19, for a purpose to be described more fully hereinafter. Handle members 20 and 21 are pivotally secured in sleeves 22 and 23 to pans 10 and 15, respectively, on the sides opposite sleeves 14 and 19.

A rod 25 is adapted to be passed through sleeve 14 and bent, as at 26 and 27, to form projecting parallel arms 28 and 29, extending at right angles to sleeve 14. Arms 28 and 29 are adapted to pass through eyes 30 and 31, respectively, formed at the ends of a second rod 32 adapted to be passed through sleeve 19, and rotatable therein. The ends of arms 28 and 29 terminate in heads or buttons 35 and 36, respectively, adapted to preclude the complete withdrawal of the arms through eyelets 30 and 31.

From the foregoing the operation of the device should be readily understood.

Figure 2:
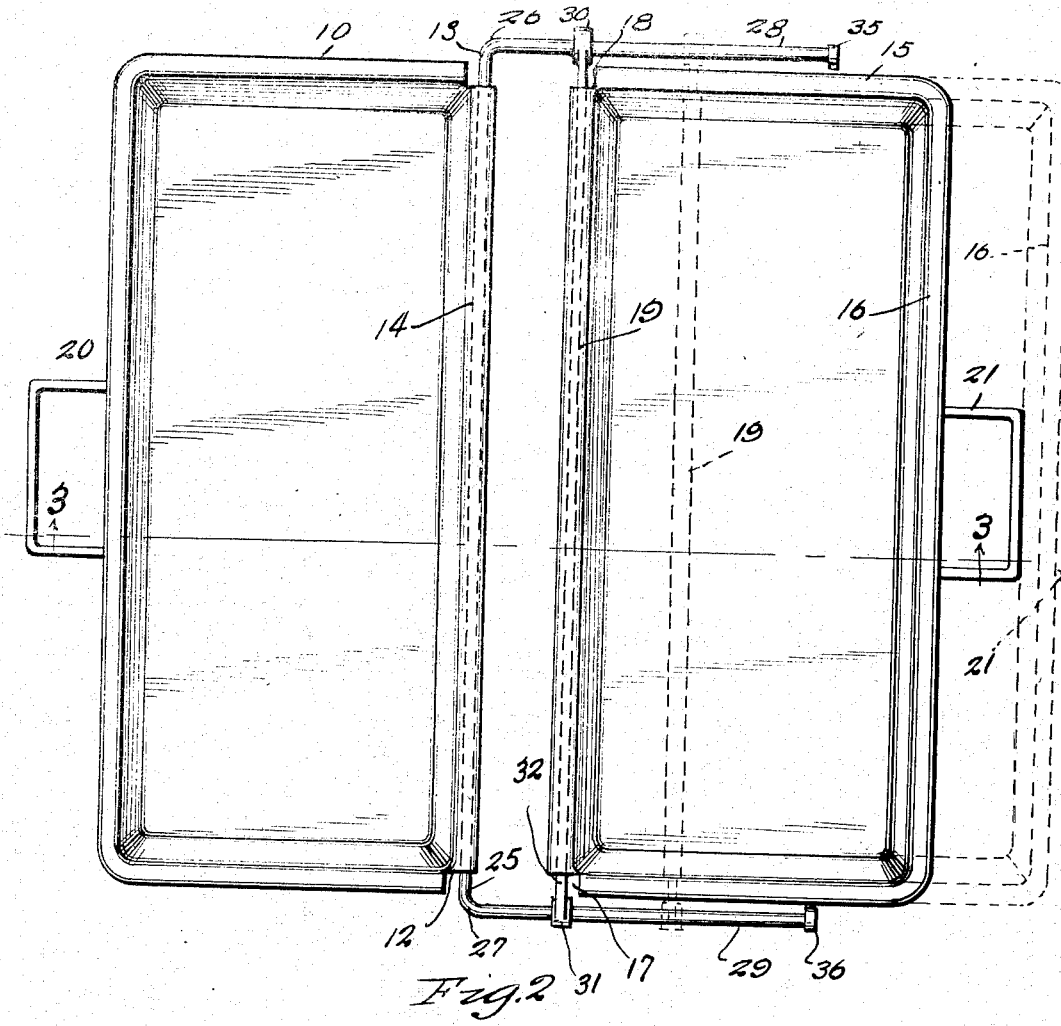
Figure 2 is a top plan view of the device shown in Figure 1, various positions of adjustment being indicated by dotted lines.
Figure 3:
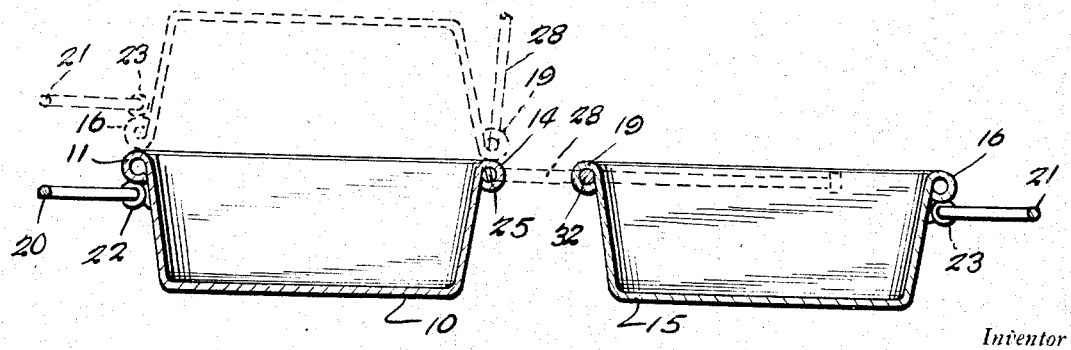
Figure 3 is sectional view taken substantially along the line 3—3 of Figure 2, as viewed in the direction indicated by the arrows.

When it is desired to utilize the pans in an oven, as, for example, when baking two trays of biscuits, the pan 15 may be moved closely adjacent pan 10 by sliding the arms 28 and 29 inwardly with respect to the eyelets 30 and 31, to produce uniform articles in both pans. Correspondingly, the device may be utilized on the top of a stove or burner or the like for any desired purpose. When it is desired to cook different foods in the two pans 10 and 15, one of which, for example, may require a relatively high temperature, and the other a comparatively lower temperature, the two pans may be separated, as indicated by dotted lines in Figure 2, until the heads 35 and 36 abut the eyelets 30 and 31, whereupon one pan may be positioned directly over or under the fire and the other spaced a distance therefrom, thus affording a relatively high heat for the contents of one pan, and a lower heat for the contents of the other, the articles to be cooked reaching completion at substantially the same time. Correspondingly, when it is desired to cook a single food requiring a covered or closed vessel, the parts may be moved to the position shown in dotted lines in Figure 3, pan 15 serving as a cover for pan 10, the arms 28 and 29 being rotated upwardly and the eyelets 30 and 31, together with their associated rods 32 turning within sleeve 19 to permit such operation.

From the foregoing, it will be seen that there is herein provided a cooking utensil accomplishing all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a cooking utensil, in combination, two pans, each having means forming a sleeve on one side thereof, a rod bent to form a U-shaped member rotatably mounted in one of said sleeves, and a second rod having eyelets at its extremities rotatably mounted in the other of said sleeves, the arms of said U-shaped member being passed through said eyelets.

2. In a cooking utensil, in combination, two pans, each having means forming a sleeve on one side thereof, a rod bent to form a U-shaped member rotatably mounted in one of said sleeves, a second rod having eyelets at its extremities rotatably mounted in the other of said sleeves, the arms of said U-shaped member being passed through said eyelets, and heads on the ends of said arms to preclude retraction of said arms through said eyelets.

EDWARD D. CAMPBELL.